(12) United States Patent
Okabe et al.

(10) Patent No.: US 10,042,107 B2
(45) Date of Patent: Aug. 7, 2018

(54) ILLUMINATION STRUCTURE FOR DECORATION

(71) Applicant: CALSONIC KANSEI CORPORATION, Saitama (JP)

(72) Inventors: Yuuta Okabe, Saitama (JP); Tooru Ookanda, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/126,105

(22) PCT Filed: Jan. 23, 2015

(86) PCT No.: PCT/JP2015/051829
§ 371 (c)(1),
(2) Date: Sep. 14, 2016

(87) PCT Pub. No.: WO2015/141276
PCT Pub. Date: Sep. 24, 2015

(65) Prior Publication Data
US 2017/0072845 A1    Mar. 16, 2017

(30) Foreign Application Priority Data
Mar. 20, 2014  (JP) ................................ 2014-057554

(51) Int. Cl.
*F21V 9/00*      (2018.01)
*F21V 8/00*      (2006.01)
(Continued)

(52) U.S. Cl.
CPC ............. *G02B 6/0051* (2013.01); *B60Q 3/20* (2017.02); *B60Q 3/225* (2017.02); *B60Q 3/64* (2017.02);
(Continued)

(58) Field of Classification Search
CPC .. B60Q 3/20; B60Q 3/225; B60Q 3/64; F21V 5/007; F21V 5/008; F21V 5/02;
(Continued)

(56) References Cited

U.S. PATENT DOCUMENTS 6,312,787 B1 * 11/2001 Hayashi ................ B29C 47/065
                                                    362/331
7,766,503 B2 *  8/2010 Heiking ................... F21S 8/026
                                                    362/147
(Continued)

FOREIGN PATENT DOCUMENTS

| CN | 103574407 | 2/2014 |
|----|-----------|--------|
| JP | 59-8546   | 1/1984 |

(Continued)

OTHER PUBLICATIONS

International Search Report dated Mar. 3, 2015 in International (PCT) Application No. PCT/JP2015/051829.

*Primary Examiner* — Ali Alavi
(74) *Attorney, Agent, or Firm* — Wenderoth, Lind & Ponack, L.L.P.

(57) ABSTRACT

An illumination structure for decoration includes a light-guiding member and a decorative member on a surface of the light-guiding member. The decorative member has a plurality of lighting parts configured to light in a dot form. A lens layer is between the light-guiding member and the decorative member and includes a plurality of convex lens parts, each of the convex lens parts facing at least one of the lighting parts. Each of the convex lens parts has a convex lens surface on a surface facing the light-guiding member, the convex lens surface being configured to curve and protrude toward the light-guiding member and focus light adjacent to the lighting parts.

12 Claims, 7 Drawing Sheets

(51) Int. Cl.
  *F21V 5/00* (2018.01)
  *G02B 6/00* (2006.01)
  *B60Q 3/64* (2017.01)
  *B60Q 3/20* (2017.01)
  *B60Q 3/225* (2017.01)
  *F21S 41/16* (2018.01)
  *F21Y 115/10* (2016.01)

(52) U.S. Cl.
  CPC .............. *F21S 41/16* (2018.01); *F21V 5/007* (2013.01); *G02B 6/00* (2013.01); *G02B 6/0053* (2013.01); *G02B 6/0055* (2013.01); *F21Y 2115/10* (2016.08)

(58) Field of Classification Search
  CPC ......... F21V 5/04; F21Y 2115/10; G02B 6/00; G02B 6/0051; G02B 6/0053; G02B 6/0055
  See application file for complete search history.

(56) References Cited

U.S. PATENT DOCUMENTS

| | | | |
|---|---|---|---|
| 2012/0320615 A1* | 12/2012 | Englert | B60Q 1/323 362/511 |
| 2014/0029292 A1* | 1/2014 | Mizushiro | G02B 6/0038 362/565 |
| 2014/0091731 A1* | 4/2014 | Fushimi | H05B 37/0245 315/292 |
| 2016/0230978 A1* | 8/2016 | Kato | F21V 29/83 |
| 2016/0257246 A1* | 9/2016 | Tsujii | B60Q 1/56 |
| 2016/0370641 A1* | 12/2016 | Hirasawa | G02F 1/133308 |

FOREIGN PATENT DOCUMENTS

| | | |
|---|---|---|
| JP | 5-238325 | 9/1993 |
| JP | 2001-191845 | 7/2001 |
| JP | 2004-109644 | 4/2004 |
| JP | 2009-212076 | 9/2009 |
| JP | 2011-198547 | 10/2011 |

* cited by examiner

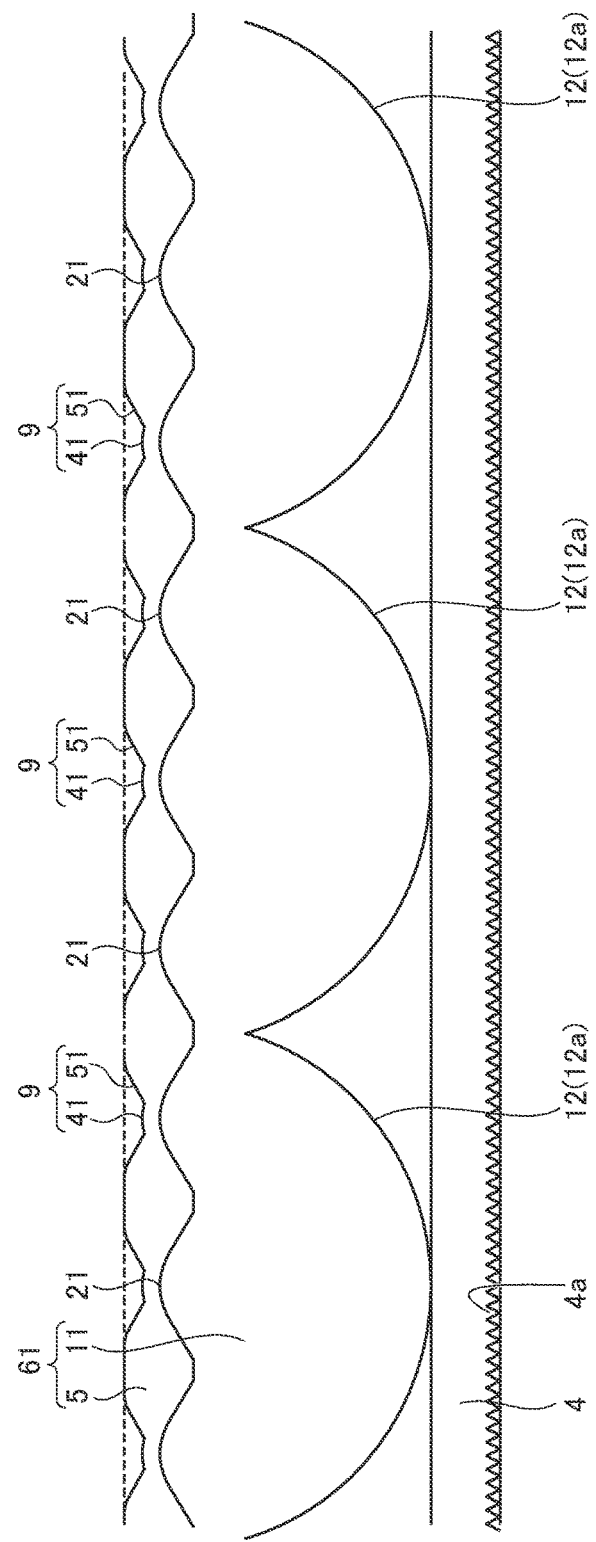

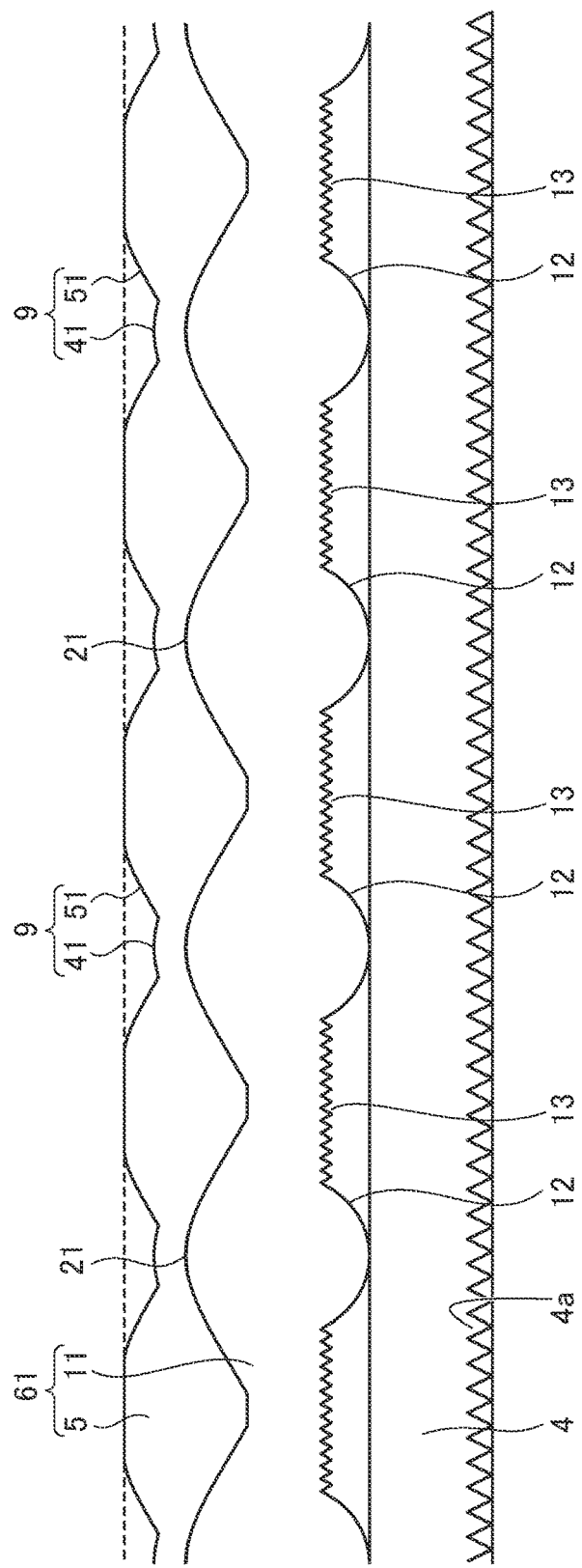

ILLUMINATION STRUCTURE FOR DECORATION

CROSS-REFERENCE TO RELATED APPLICATION

This application is based upon and claims the benefit of priority to Japanese Patent Application No. 2014-57554, filed on Mar. 20, 2014, the entire disclosures of which are incorporated herein by reference.

TECHNICAL FIELD

The present disclosure relates to an illumination structure for decoration.

BACKGROUND ART

A structure configured to illuminate a vehicle interior in a vehicle such as an automobile for the purpose of decoration is known (for example, see JPS59-8546A). The decorative illumination is applied to a door panel or ceiling panel, for example.

In an illumination structure for decoration disclosed in JPS59-8546A, decoration illumination lighting in a dot form is carried out by covering a skin material having a plurality of small holes on a surface of a light-guiding member, introducing light from an end portion of the light-guiding member, and leaking the light passing through the plurality of small holes provided in the skin material.

Technical Problem

However, in the illumination structure for decoration as described above, light emitted from the surface of the light-guiding member is merely introduced into a vehicle interior through the small holes of the skin material. Light-emitting brightness is therefore low, and it is hard to say that light is efficiently employed.

SUMMARY

It is therefore a main object of the disclosure to solve the above problem and increase light-emitting brightness.

Solution to Problem

To solve the above problem, in an illumination structure for decoration including a light-guiding member and a decorative member provided on the light-guiding member and having a plurality of lighting parts that emits light in a dot form, the illumination structure for decoration includes a lens layer disposed between the light-guiding member and the decorative member and including a plurality of convex lens parts facing each of the lighting parts. The convex lens parts each have a convex lens surface provided on a surface facing the light-guiding member and configured to curve and protrude toward the light-guiding member and to focus light close to the lighting parts. A focal point of each of the convex lens parts is set inside the lens layer such that each of the convex lens parts focuses and diffuses the light at the focal point and takes the light out to an outside of the lens layer to illuminate the lighting parts with the diffusing light.

Advantageous Effects

The following advantageous effect can be acquired by the above configuration. That is to say, the lens layer having the plurality of convex lens parts is provided between the light-guiding member and the decorative member. Light from the light-guiding member is thereby focused close to the lighting parts of the decorative member by the convex lens parts provided on the lens layer. The light is diffused after the focusing and transmits the lighting parts. The light transmitting the lighting parts is focused and diffused because of this. It is thereby possible to improve light-emitting brightness and spread a light-emitting range of the light at the lighting parts. With this, the light emitted from the light-guiding member can be efficiently employed. Further, a focal point of each of the convex lens parts is set inside the lens layer such that each of the convex lens parts can focus and diffuse the light at the focal point and take the light out to an outside of the lens layer to illuminate the lighting parts with the diffusing light.

BRIEF DESCRIPTION OF DRAWINGS

FIG. 8 is an enlarged partial longitudinal sectional view of the tray part in which one convex lens part corresponds to a plurality of lighting parts.

FIG. 9 is an enlarged partial longitudinal sectional view of the tray part in which diffused reflection surfaces such as grains are formed between convex lenses.

DETAILED DESCRIPTION OF EMBODIMENT

An embodiment according to the present disclosure will be described hereinafter in detail with reference to the accompanying drawings. FIGS. 1 to 9 illustrate the embodiment.

Embodiment 1

<Configuration>

A configuration of the embodiment is described hereinafter. Illumination for decoration is provided in a vehicle interior of a vehicle such as an automobile. In this case, an illumination structure for decoration is provided in a tray part 2 disposed at a front side of a center console part 1 provided between a driver's seat and a front passenger seat in the vehicle interior, as shown in a perspective view of FIG. 1 and a plan view of FIG. 2. However, the provision of the illumination structure for decoration is not limited to only the tray part 2. The illumination structure for decoration may be provided on a door panel, a ceiling panel, other panels etc., for example.

Figure 1:
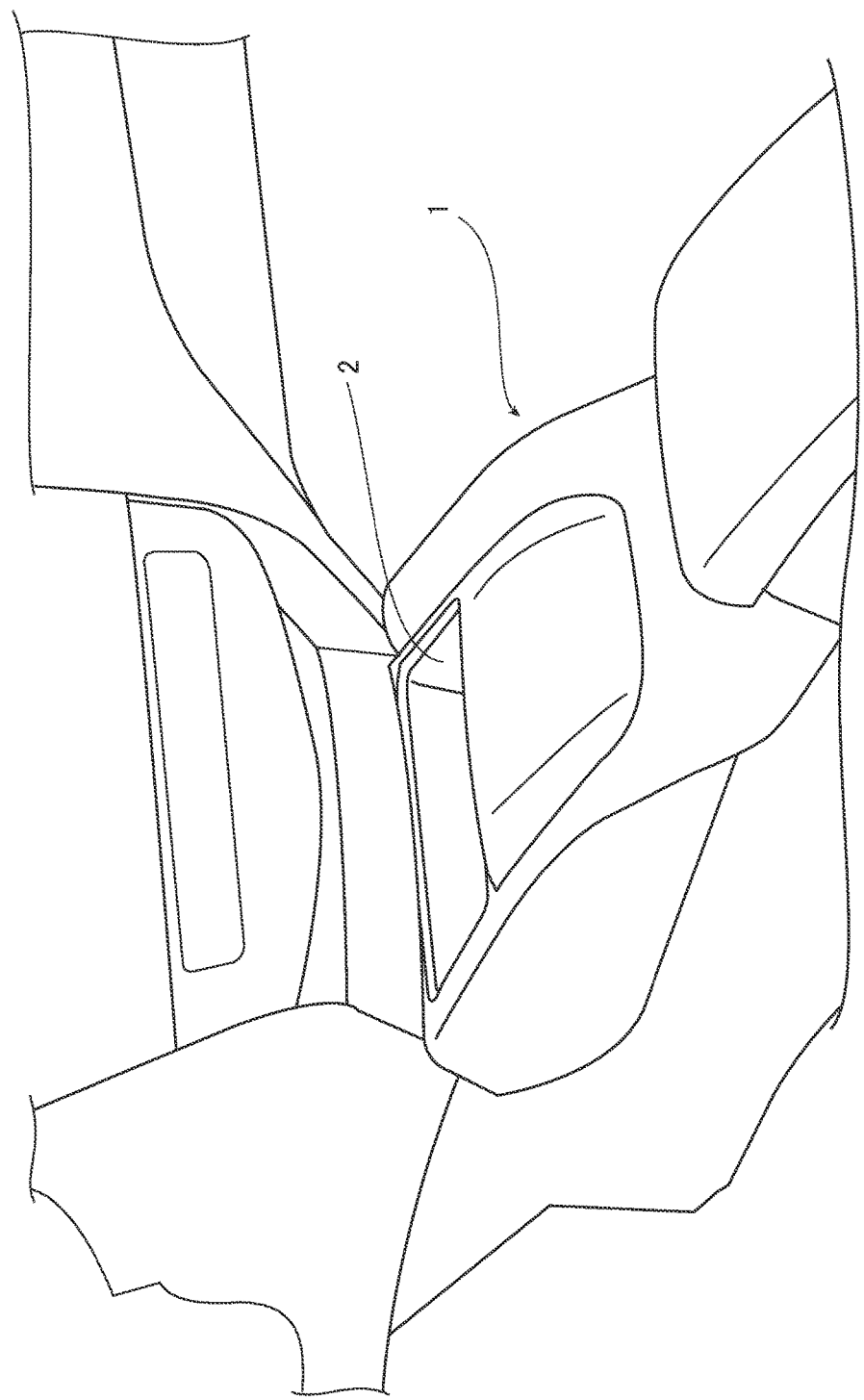
FIG. 1 is a perspective view of a center console part provided with an illumination structure for decoration according to an embodiment.
Figure 2:
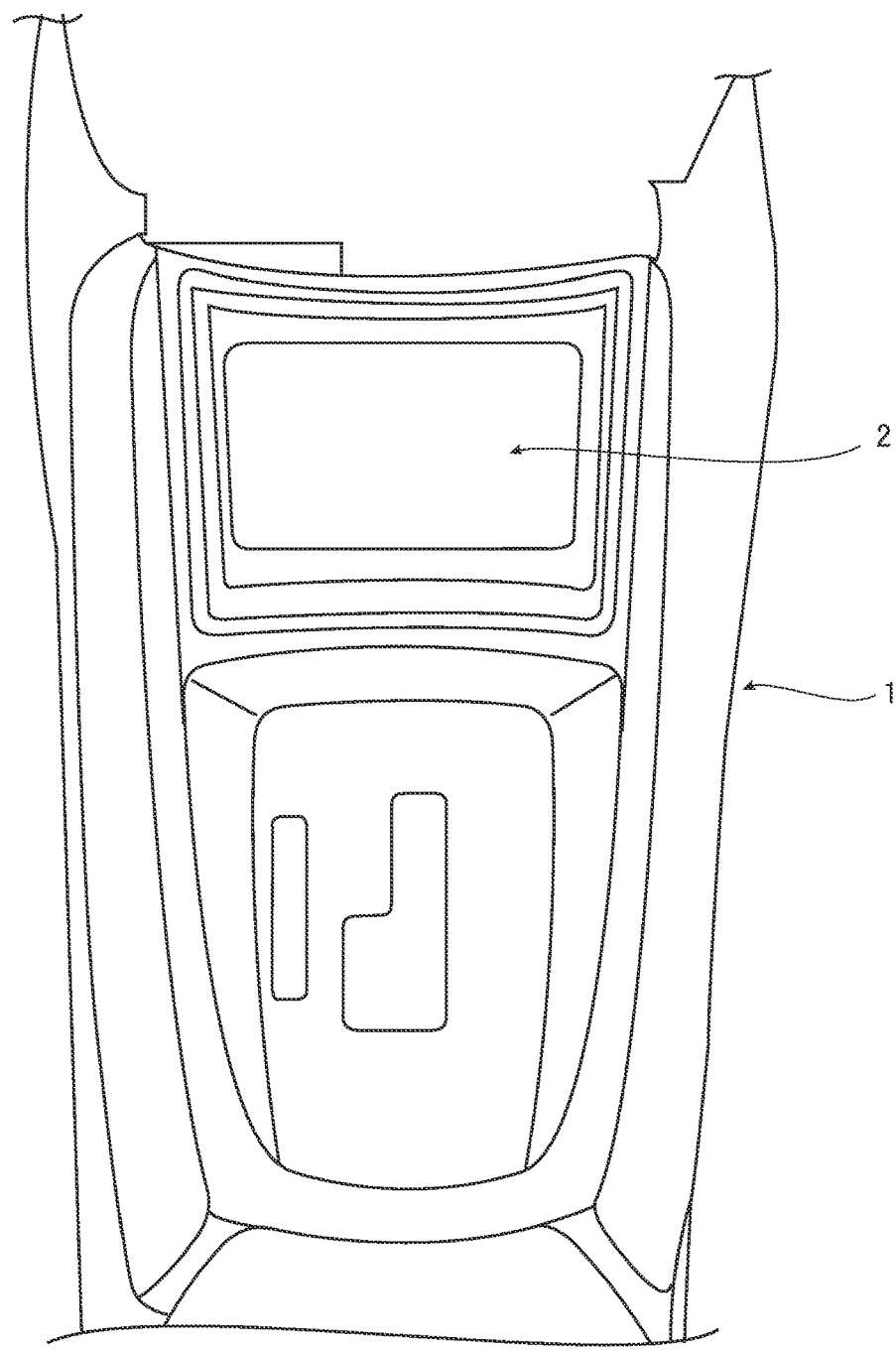
FIG. 2 is a plan view of the center console part of FIG. 1.
Figure 3:
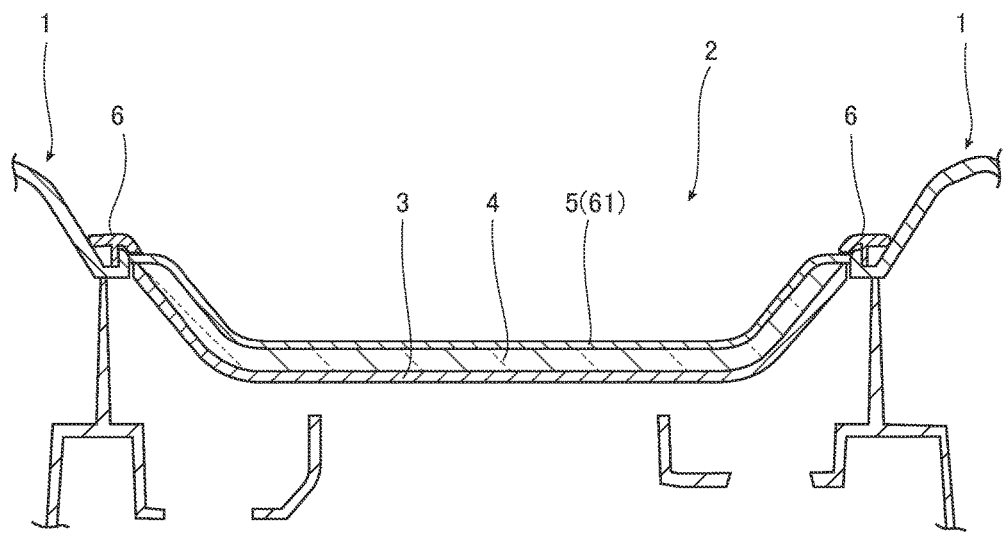
FIG. 3 is a longitudinal sectional view of the center console part of FIG. 2 taken along a width direction of a vehicle.
Figure 4:
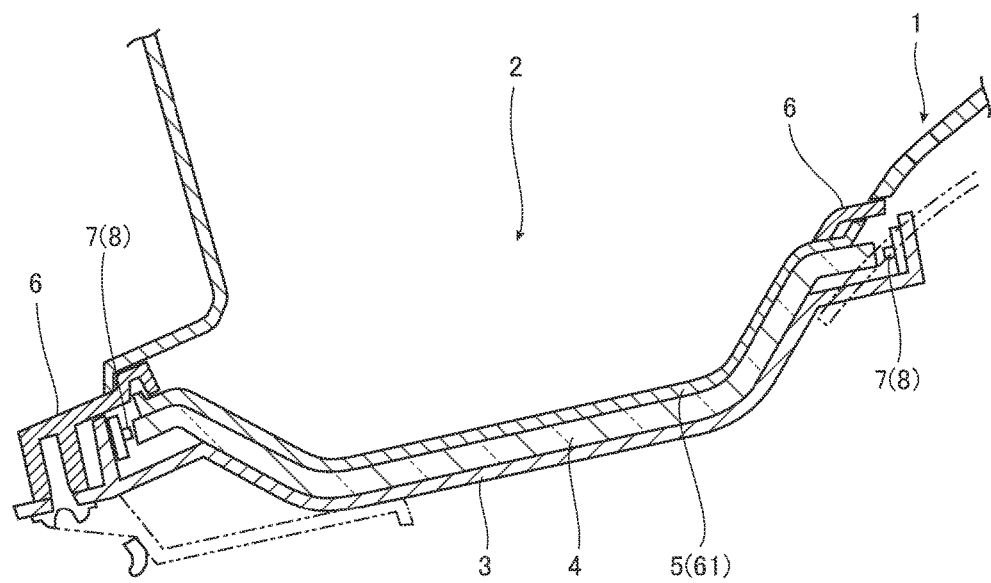
FIG. 4 is a longitudinal sectional view of the center console part of FIG. 2 taken along a longitudinal direction of the vehicle.
Figure 5:
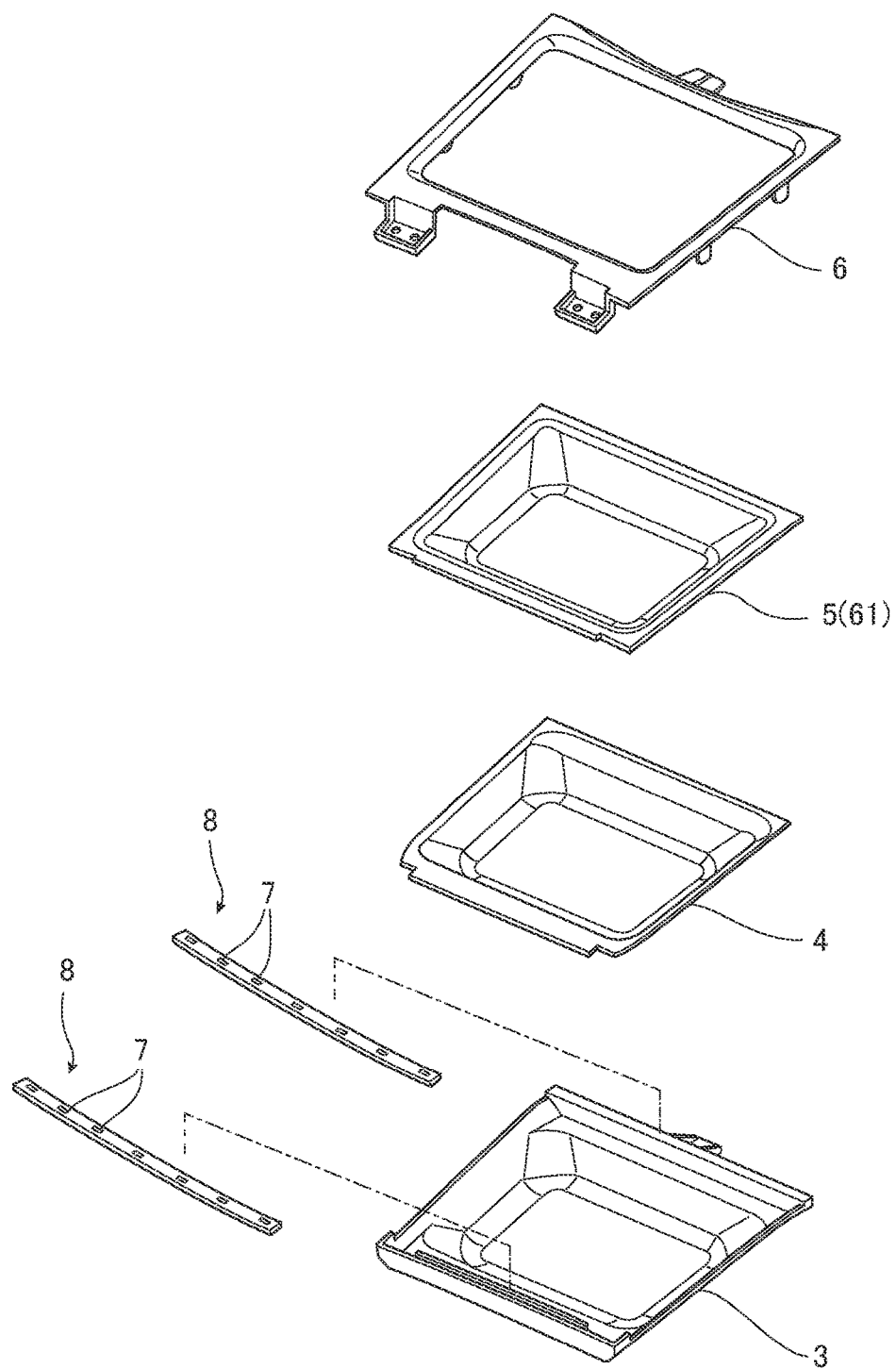
FIG. 5 is an exploded perspective view of a tray part provided with the illumination structure for decoration of FIG. 1.
Figure 6:
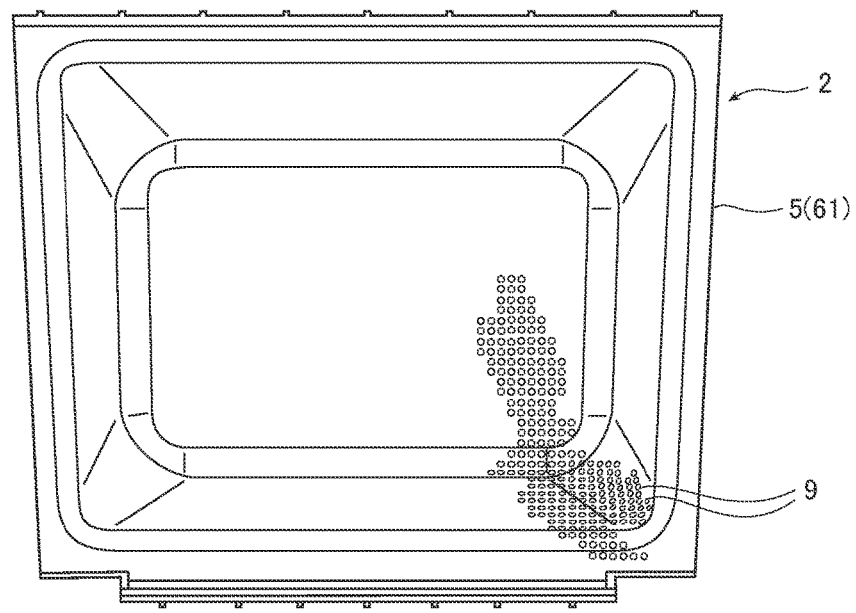
FIG. 6 is a plan view of the tray part (decorative component) of FIG. 5.

The tray part 2 is configured to have a sectional structure as shown in FIGS. 3 and 4 and an exploded structure as shown in FIG. 5. In other words, the tray part 2 has at the lowermost side thereof a basic shape of the tray part 2 and a shallow dish-shaped base part 3 as a light-shielding member. A shallow dish-shaped light-guiding member 4 and a decorative member 5 are disposed in order on the base part 3. In addition, a decorative frame member 6 bordering a peripheral portion is mounted on these members from above. Rod-shaped light source parts 8 having light-emitting diodes such as a plurality of LEDs 7 are mounted on the base part 3 to face the light-guiding member 4, as shown in FIG. 5. In addition, a plurality of lighting parts 9 lighting in a dot form, as shown in FIG. 6 is provided on a decorative member 5 disposed on a surface of the light-guiding member 4.

Here, the base part 3 is formed by a hard light-shielding resin material etc. of light-color system of white color etc. The light-guiding member 4 is formed by a transparent resin material. A reflection part 4a (see FIG. 7) that reflects light from the light source parts 8 toward the decorative member 5 is suitably formed on a bottom surface of the light-guiding member 4. The reflection part 4a has a grain pattern, or a fine reflection surface etc. However, it is desirable for the reflection part 4a to have a reflection surface that reflects the light as parallel light perpendicular to the light-guiding member 4. A resin material of a soft rubber system such as an elastomer is used for the decorative member 5, for example. A pair of light source parts 8 is provided along front and rear sides of the tray part 2. The lighting parts 9 are arranged so as to form a fine grid-shaped pattern on the generally entire surface of the decorative member 5.

The embodiment has the following configurations in addition to the above-described basic configuration.

Figure 7:
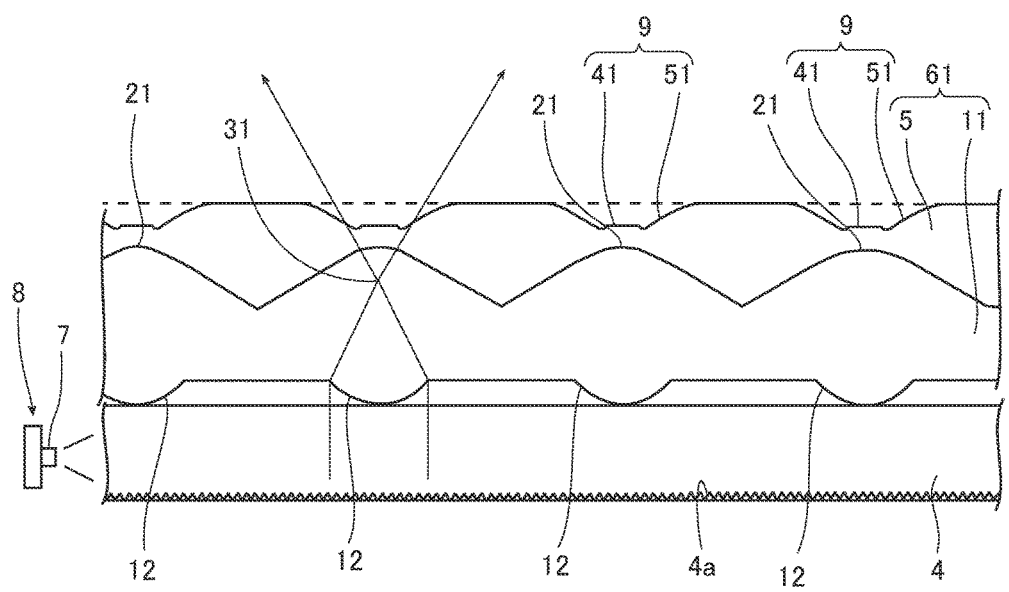
FIG. 7 is an enlarged partial longitudinal sectional view of the tray part of FIG. 6.

(1) As shown in FIG. 7, a lens layer 11 is provided between the light-guiding member 4 and the decorative member 5. The lens layer 11 has a plurality of convex lens portions 12 facing each of the lighting parts 9. The convex lens parts 12 are curved and protruded to extend toward the light-guiding member 4 to a surface of the light-guiding member 4 so as to form convex lens surfaces that focus the light on positions close to the lighting parts 9.

Here, the lens layer 11 is formed by a transparent resin material. The convex lens parts 12 are configured to have downward protruded convex lens surfaces (downward lenses) and integrally formed with the lens layer 11. In this case, each of the convex lens parts 12 faces each of the lighting parts 9. However, one of the convex lens parts 12 may face the plurality of lighting parts 9 (for example, an arrangement of numbers of 3×3 lengthwise and breadthwise) as referred to as a lens corresponding to plural light sources, as shown in FIG. 8. Or, each of the convex lens parts 12 may be configured by a plurality of micro lenses that focus light on one focal point. Note that each of the convex lens parts 12 may be arranged to be offset from the corresponding lighting part 9 according to a reflection direction of light reflected on the reflection part 4a, without being disposed right below the lighting part 9. Furthermore, diffused reflection surfaces 13 such as grains may be formed between the convex lens parts 12, as shown in FIG. 9. The light entered the diffused reflection surfaces from the light-guiding member 4 is thus diffused and can be guided to the lighting parts 9, accomplishing high brightness.

(2) A plurality of upper lens portions 21 is provided on a surface of the lens layer 11 facing the decorative member 5 such that each of the upper lens portions 21 faces each of the lighting parts 9.

Here, the upper lens portions 21 are formed into convex lenses configured to curve and protrude toward the decorative member 5. The upper lens portions 21 may be configured to protrude upward from an upper surface of the lens layer 11 which is a flat surface, similarly to the convex lens parts 12. However, in this case, the upper lens portions are configured to provide on the upper surface of the lens layer 11 having concave and convex portions as a whole in consideration of a gradient for mold releasing etc. Concretely, the upper lens portions 21 are provided at positions of top points of the concave and convex surfaces of continued mountain shapes. Note that the upper lens portions 21 may be provided as necessary.

(3) A focal point 31 of each of the convex lens parts 12 (lower lenses) is set inside the lens layer 11.

In this case, the focal point 31 is set at a slightly lower position than (lens surfaces of) the upper lens portions 21. However, the position of the focal point 31 is not limited to the slightly lower position than the upper lens portions 21.

(4) Each of the above-described lighting parts 9 is configured to have a thin section 41 capable of transmitting light.

Here, the thin section 41 has approximately a circular shape as viewed from a plan of about 0.5 mm in diameter and about 0.25 mm in thickness, for example. An interval between the adjacent thin sections is about 2.5 mm. However, each size regarding the thin sections 41 is not limited to this. Here, it is not necessary for the decorative member 5 to provide the partial thin sections 41 on the lighting parts 9. For example, the decorative member 5 may have an optimal even thickness for the lighting parts 9 throughout the entirety. In this way, by removing the partial thin sections 41 from the decorative member 5, light transmissivity around the lighting parts 9 in the decorative member 5 can be improved. As a result, it is possible to enhance brightness of the lighting parts 9 due to the improved light transmissivity.

(5) A dent portion 51 that dents toward the thin section 41 is provided on the surface of each of the lighting parts 9. The dent portion 51 is configured to have the same shape as a diffusion shape where the light focused by the convex lens part 12 diffuses after the focusing, or a conical shape spreading more than the diffusion shape.

Here, in the dent portion 51, a depth from a surface to the thin section 41 which is a bottom surface is about 0.25 mm. The conical shape of the dent portion 51 is configured to upward widen with an angle of about 60 degrees to a direction perpendicular to a surface. However, each size of the dent portion 51 is not limited to this. The diffusion shape of the light includes a diffusion shape of light formed by upper lens portions 21.

(6) The lens layer 11 is integrally formed with the decorative member 5 by two color molding.

Here, the above-described lens layer 11 is formed as a first layer of the two color molding. The decorative member 5 is formed on the surface of the lens layer 11 as a second layer (decorative layer) of the two color molding. Accordingly, an integral decorative illumination component 61 is manufactured with the decorative member 5 and the lens layer 11.

Here, each of the convex lens parts 12 has at least a diameter larger than that of each thin section 41 and preferably has a diameter larger than that of each lighting part 9. It is possible to more efficiently use the light from the light-guiding member 4 by increasing the diameter of each of the convex lens parts 12 in this way.

<Effects>

According to the embodiments as described, the following effects can be acquired. When the light source parts 8 are lighted, the light from the light source parts 8 light the lighting parts 9 provided on the decorative member 5 through the light-guiding member 4 and the lens layer 11. The illumination of the tray part 2 is thereby carried out.

(1) The lens layer 11 having the plurality of convex lens parts 12 (lower lenses) is provided between the light-guiding member 4 and the decorative member 5. The light (parallel light) from the light-guiding member 4 is thereby focused close to the lighting parts 9 of the decorative member 5 by the convex lens parts 12 provided on the lens layer 11. The light is diffused after the focusing and transmits the lighting parts 9. The light transmitting the lighting parts 9 is focused and diffused because of this. It is thereby possible to improve light-emitting brightness and spread a light-emitting range of the light at the lighting parts 9. With this, it is possible to efficiently employ the light from the light-guiding member 4.

(2) The upper lens portions 21 (convex lenses) are provided on the surface of the lens layer 11 facing the decorative member 5. The light can be thereby diffused when emitting from the lens layer 11. In addition, it is possible to achieve a large magnification for diffusion of the light by doubly providing the convex lens parts 12 and the upper lens portions 21.

(3) The focal point 31 of each convex lens part 12 is set inside the lens layer 11. It is thereby possible to focus and diffuse the light at the focal point 31 inside the lens layer 11 and take out the light to an outside of the lens layer 11. In other words, because the focusing and the diffusion of the light is carried out at a position behind the lighting part 9, the light can be advantageously diffused. In addition, when the upper lens portions 21 are provided, the light focused and diffused at the focal points 31 inside the lens layer 11 is further diffused by the upper lens portions 21 as emitting from the lens layer 11. Therefore, it is possible to further increase the diffusion effect of the light.

(4) The lighting parts 9 are configured by the thin sections 41. The lighting parts 9 are thereby illuminated with the light transmitting the thin sections 41. As a result, it is possible to acquire illumination effect having high-grade sense. In addition, by forming the lighting parts 9 with the thin sections 41, as in a case where the lighting parts 9 are formed by the small holes, defects that illumination is not effective by the small holes being clogged with dust and that the small holes are unexpectedly cracked, etc. can be prevented.

(5) The dent portions 51 each that dents in the conical shape toward the thin sections 41 are provided on the surfaces of the lighting parts 9. The dent portions 51 thereby correspond to the diffusion shape of the light, or have a shape slightly wider than the diffusion shape. The dent portions 51 do not block the diffusion of the light and are configured to be capable of looking at the light from various positions or angles. In other words, it is possible to spread a visually recognizable range of illumination. About circumferential portions of the dent portions 51, the decorative member 5 is thickened. As a result, the decorative member 5 and the thin sections 41 are not damaged easily. Furthermore, it is possible to give unique texture to the decorative member 5 by the plurality of dent portions 51.

(6) The lens layer 11 is integrated with the decorative member 5 by the two color molding. The lens layer 11 and the decorative member 5 can be thereby formed at one time and reduction of cost due to reduction of the number of parts can be accomplished. In addition, by integrating the lens layer 11 and the decorative member 5, a positional relationship between each of all the lighting parts 9 and each of the upper lens portions 21 is precisely regulated. It is thereby possible to light the lighting parts 9 further efficiently.

Although the embodiment has been described with reference to the drawings, the embodiment is a mere example. Accordingly, changes in design within a scope that does not depart from the gist should be, of course, included in the embodiment without being limited to only the configuration of the embodiment. In addition, for example, in a case where a plurality of configurations is included in each embodiment, of course, a possible combination of the configurations should be included in the embodiment, even if there is no explanation, in particular. If a plurality of embodiments or modifications is disclosed, of course, a possible combination of configuration across them should be included in the embodiments, even if there is no explanation, in particular. As to configurations shown in drawings, they should be included in the embodiments, even if there is no explanation, in particular. Furthermore, the word, "etc." is used to include equivalents. If words such as "approximate" "about" and "degree" exist, they are used in a meaning including things of a range and precision recognized in common-sense.

DESCRIPTION OF REFERENCE SIGNS

4 light-guiding member
5 decorative member
9 lighting parts
11 lens layer
12 convex lens parts
21 upper lens portions
31 focal point
41 thin sections
51 dent portions

The invention claimed is:

1. An illumination structure for decoration including a light-guiding member and a decorative member on the light-guiding member, the decorative member having a plurality of lighting parts configured to light in a dot form, the illumination structure comprising:
   a lens layer between the light-guiding member and the decorative member, the lens layer including a plurality of convex lens parts, each of the convex lens parts facing at least one of the lighting parts,
   wherein each of the convex lens parts has a convex lens surface on a surface facing the light-guiding member, the convex lens surface being configured to curve and protrude toward the light-guiding member and focus light adjacent to the lighting parts, and
   wherein a focal point of each of the convex lens parts is set inside the lens layer such that each of the convex lens parts is configured to focus and diffuse the light at the focal point and take the light out to an outside of the lens layer to illuminate the at least one of the lighting parts with the light.

2. The illumination structure according to claim 1, further comprising a plurality of upper lens portions on a surface of the lens layer facing the decorative member, each of the upper lens portions facing one of the lighting parts.

3. The illumination structure according to claim 2, wherein the lens layer is integrated with the decorative member by two color molding.

4. The illumination structure according to claim 2, wherein each of the lighting parts has a thin section configured to transmit the light.

5. The illumination structure according to claim 4, wherein the lens layer is integrated with the decorative member by two color molding.

6. The illumination structure according to claim 4, wherein a dent portion is defined in a surface of each of the lighting parts, the dent portion dents toward the thin section, and the dent portion is configured to have a same shape as a diffusion shape where the light focused by one of the convex lens diffuses after the focusing, or a conical shape spreading more than the diffusion shape.

7. The illumination structure according to claim 6, wherein the lens layer is integrated with the decorative member by two color molding.

8. The illumination structure according to claim 1, wherein each of the lighting parts has a thin section configured to transmit the light.

9. The illumination structure according to claim 8, wherein the lens layer is integrated with the decorative member by two color molding.

10. The illumination structure according to claim 1, wherein the lens layer is integrated with the decorative member by two color molding.

11. An illumination structure for decoration including a light-guiding member and a decorative member on the light-guiding member, the decorative member having a plurality of lighting parts configured to light in a dot form, the illumination structure comprising:

a lens layer between the light-guiding member and the decorative member, the lens layer including a plurality of convex lens parts, each of the convex lens parts facing at least one of the lighting parts, wherein each of the convex lens parts has a convex lens surface on a surface facing the light-guiding member, the convex lens surface being configured to curve and protrude toward the light-guiding member and focus light adjacent to the lighting parts, wherein each of the lighting parts has a thin section configured to transmit the light, and wherein a dent portion is defined in a surface of each of the lighting parts, the dent portion dents toward the thin section, and the dent portion is configured to have a same shape as a diffusion shape where the light focused by one of the convex lens parts diffuses after the focusing, or a conical shape spreading more than the diffusion shape.

12. The illumination structure according to claim 11, wherein the lens layer is integrated with the decorative member by two color molding.

* * * * *